United States Patent
Chen

(10) Patent No.: US 9,723,033 B2
(45) Date of Patent: Aug. 1, 2017

(54) ROUTER

(71) Applicant: ASUSTeK COMPUTER INC., Taipei (TW)

(72) Inventor: Chun-Wen Chen, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 43 days.

(21) Appl. No.: 14/733,936

(22) Filed: Jun. 8, 2015

(65) Prior Publication Data

US 2016/0359549 A1 Dec. 8, 2016

(51) Int. Cl.
| | | |
|---|---|---|
| H04B 7/14 | (2006.01) | |
| H04L 29/06 | (2006.01) | |
| H04W 80/10 | (2009.01) | |
| H04W 84/12 | (2009.01) | |
| H04W 88/10 | (2009.01) | |

(52) U.S. Cl.
CPC ......... *H04L 65/1069* (2013.01); *H04W 80/10* (2013.01); *H04W 84/12* (2013.01); *H04W 88/10* (2013.01)

(58) Field of Classification Search
CPC .................................................. H04B 7/2606
See application file for complete search history.

(56) References Cited

U.S. PATENT DOCUMENTS

| | | | | |
|---|---|---|---|---|
| 6,067,351 A | * | 5/2000 | Guyot | H04L 12/2856 379/93.01 |
| 2009/0147772 A1 | * | 6/2009 | Rao | H04L 12/1818 370/352 |
| 2009/0161626 A1 | * | 6/2009 | Crawford | H04W 36/14 370/331 |
| 2010/0290390 A1 | * | 11/2010 | Souissi | H04L 63/0236 370/328 |
| 2014/0321298 A1 | * | 10/2014 | Chow | H04L 41/083 370/252 |

FOREIGN PATENT DOCUMENTS

| | | |
|---|---|---|
| TW | I389522 | 3/2013 |
| TW | 201328396 | 7/2013 |

* cited by examiner

*Primary Examiner* — Samina Choudhry
(74) *Attorney, Agent, or Firm* — Jianq Chyun IP Office

(57) ABSTRACT

A router including a processor, a wide area network (WAN) signal transceiver, and a local area network (LAN) is provided. The WAN signal transceiver is controlled by the processor. The WAN signal transceiver is configured to transceive voice signals and data signals with a base station via a telecommunication network. The LAN signal transceiver is controlled by the processor. The LAN signal transceiver is configured to transceive the voice signals and the data signals with a wireless access point via a local area network.

10 Claims, 9 Drawing Sheets

ROUTER

BACKGROUND OF THE INVENTION

1. Field of the Invention

The present invention generally relates a router, in particular, to a router and a wireless access point capable of providing good communication quality

2. Description

Long-Term Evolution (LTE) is a standard for wireless communication of high-speed data for mobile phones and data terminals. Transmission speed and stability of LTE are improved as related technology improves continuously. Furthermore, LTE for wireless communication is convenient to use without physical wiring. Therefore, it becomes popular and preferred communication connection mean of users under considerations of cost, connection speed and convenience.

For setting up a communication between a user terminal and a based station via LTE, a LTE router is necessary. The conventional LTE router is usually arranged indoors. The LTE router arranged indoors may be equipped with an indoor antenna for transceiving data and voice signals. However, the communication quality of indoor antenna is relatively poor.

SUMMARY OF THE INVENTION

Accordingly, the present invention is directed to a router capable of providing good communication quality.

An exemplary embodiment of the invention provides a router including a processor, a wide area network (WAN) signal transceiver, and a local area network (LAN) signal transceiver. The WAN signal transceiver is controlled by the processor and configured to transceive the voice and data signals with a base station via a telecommunication network. The LAN signal transceiver is controlled by the processor and configured to transceive the voice and data signals with a wireless access point via a local area network.

Based on above, in the exemplary embodiments of the invention, a voice conversation between the wireless access point and the base station is conducted through the router, so that good signal quality is provided during the voice conversation.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
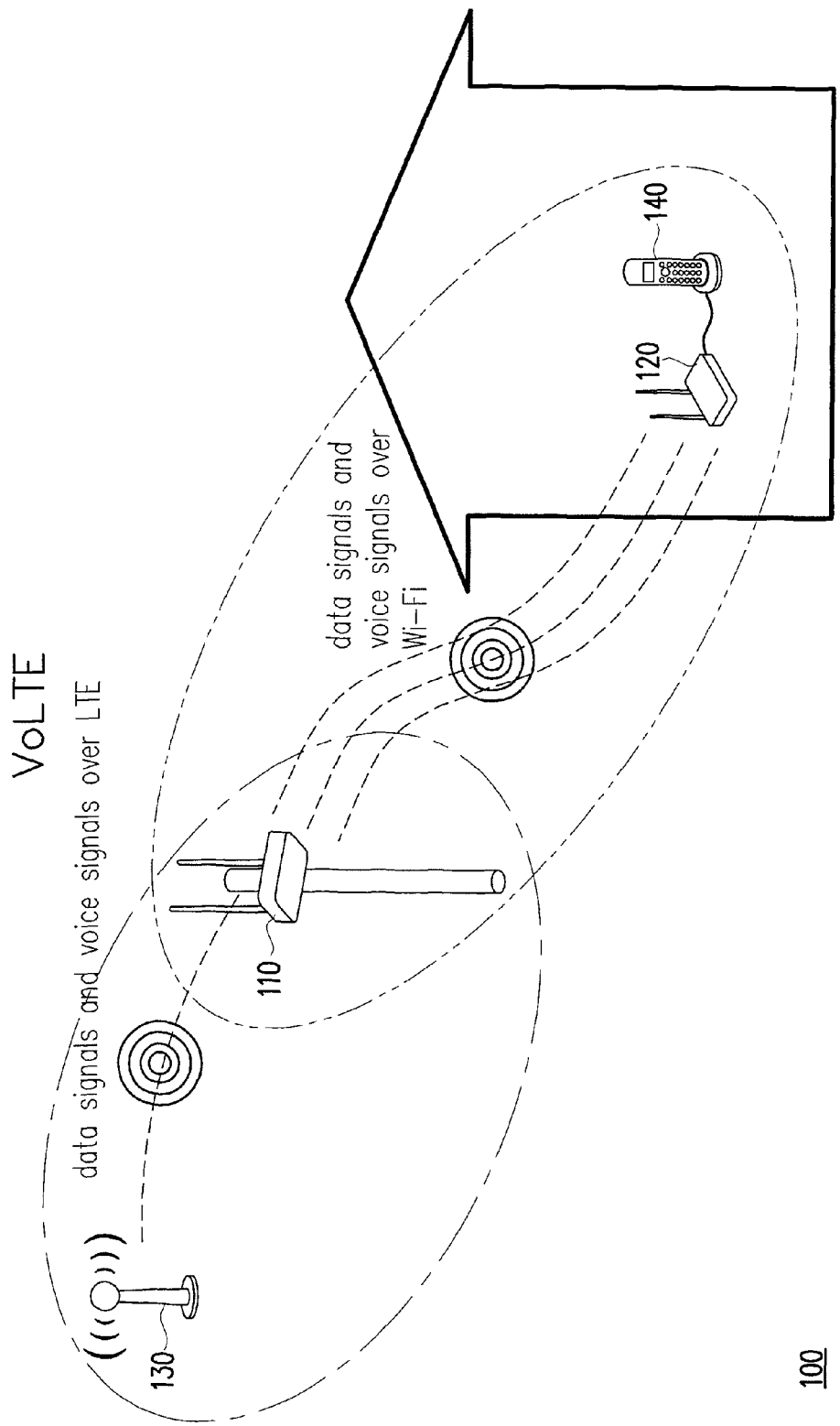
FIG. 1 illustrates a wireless network architecture according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a wireless network architecture according to an exemplary embodiment of the invention. Referring to FIG. 1, the wireless network architecture 100 mainly includes a first wireless access point 110, a second wireless access point 120 and a based station 130. The first wireless access point 110 may be a router, and the second wireless access point 120 may be a router, a repeater or an adapter. In an embodiment, the first wireless access point 110 and the second wireless access point 120 may be deemed as a communication system, and voice/data conversation may be conducted therebetween, for example. In this exemplary embodiment, the repeater is exemplary for the second wireless access point 120 in the disclosure, but the invention is not limited thereto. Furthermore, the first wireless access point 110 may also communicate with more than one second wireless access points, such as multiple repeaters in another exemplary embodiment.

Figure 2:
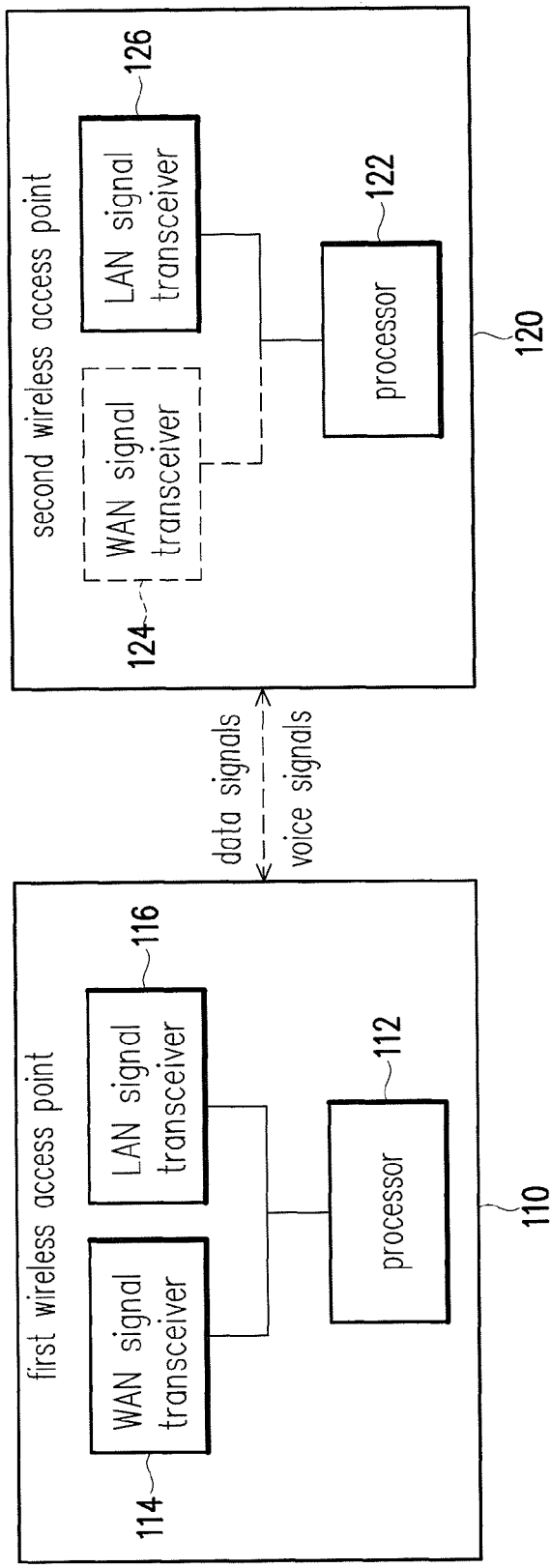
FIG. 2 illustrates a block diagram of the two wireless access points according to an exemplary embodiment of the invention.

FIG. 2 illustrates a block diagram of the two wireless access points according to an exemplary embodiment of the disclosure. Referring to FIG. 1 and FIG. 2, the first wireless access point 110 depicted in FIG. 2 may be a router and includes a processor 112, a wide area network (WAN) signal transceiver 114, and a local area network (LAN) signal transceiver 116 in this exemplary embodiment. As shown in FIG. 2, the processor 112, the WAN signal transceiver 114, and the LAN signal transceiver 116 are separately configured in the first wireless access point 110, but is not limited thereto. In other exemplary embodiments, the processor 112, the WAN signal transceiver 114, and the LAN signal transceiver 116 may also be combined in the same chipset. In actual application, the first wireless access point 110 may further include the functional elements such as a calculation module, a storage module, a communication module and a power module. Since these elements are well known by persons having ordinary skill in the art, they are not described for a concise purpose.

In this exemplary embodiment, the processor 112 is configured to control the WAN signal transceiver 114 and the LAN signal transceiver 116, so as to allow the first wireless access point 110 to communicate with the base station 130 and the second wireless access point 120 respectively. To be specific, the WAN signal transceiver 114 transceives voice signals and data signals with the base station 130 via a telecommunication network. The LAN signal transceiver 116 transceives the voice signals and the data signals with the second wireless access point 120 via a local area network (LAN). In this exemplary embodiment, via the local area network, the LAN signal transceiver 116 transceives the voice signals and the data signals with the second wireless access point 120 over a first communication standard, such as wireless fidelity (WiFi) communication protocol. By contrast, via the telecommunication network, the WAN signal transceiver 114 transceives the voice signals and the data signals with the base station 130 over a second communication standard, such as LTE communication protocol. That is to say, the first wireless access point 110 conducts a voice conversation between the second wireless access point 120 and the base station 130 by using voice over LTE (VoLTE) technology, for example.

In this exemplary embodiment, the second wireless access point 120 is similar to the first wireless access point 110 and may at least include a processor 122 and a LAN signal transceiver 126 for communicating with the first wireless access point 110. For a router, the second wireless access point 120 may further include a WAN signal transceiver 124. The LAN signal transceiver 126 of the second wireless access point 120 is controlled by the processor 122 thereof. The LAN signal transceiver 126 is configured to transceive voice signals and data signals with the first wireless access point 110 via the local area network, and transceive the voice signals and the data signals with the base station 130 via the telecommunication network through the first wireless access point 110. In this exemplary embodiment, after receiving the voice signals and the data signals from the first wireless access point 110, the second wireless access point 120 may at least transmit the voice signals to one or multiple user terminals 140 that are capable of parsing the voice signals, such as indoor phones or portable electronic devices including software phone app, notebook computers, tablet computers, smart phones, smart watches and etc. In another embodiment, the second wireless access point 120 and the user terminals 140 may be integrated to single device by adding SLIC modules or DECT modules.

Figure 3:
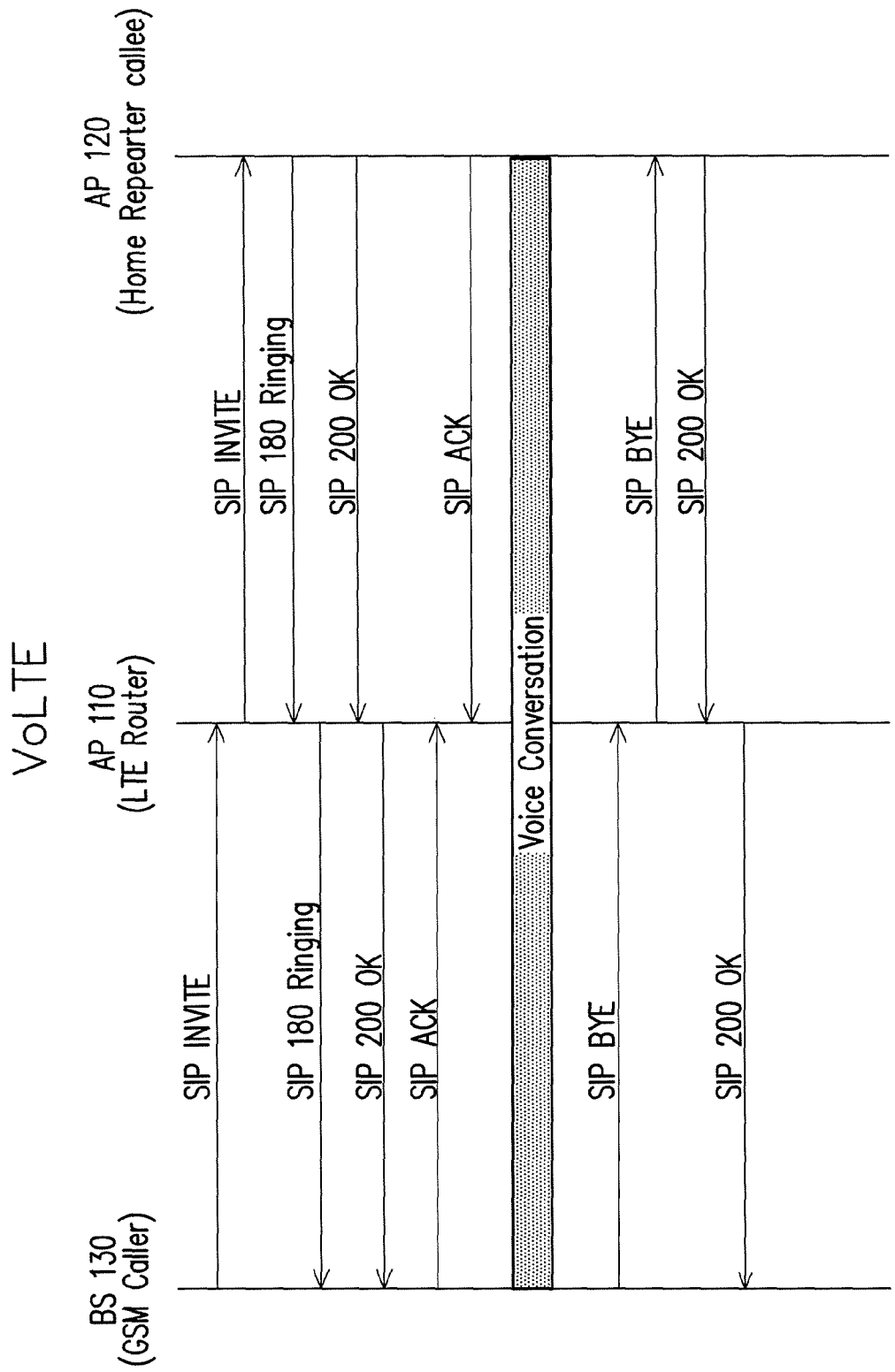
FIG. 3 is a time flowchart illustrating a voice conversation between the base station and the second wireless access point through the first wireless access point according to an exemplary embodiment of the invention.

FIG. 3 is a time flowchart illustrating a voice conversation between the base station and the second wireless access point through the first wireless access point according to an exemplary embodiment. Referring to FIG. 1 to FIG. 3, the processor 112 performs a signalling procedure with the base station 130 and the second wireless access point 120 before the voice conversation is conducted. In this exemplary embodiment, the processor 112 performs the signalling procedure via the WAN signal transceiver 114 to set up a first communication between the first wireless access point 110, i.e. the router, and the base station 130 by session initiation protocol (SIP). The processor 112 also performs the signalling procedure via the LAN signal transceiver 116 to set up a second communication between the first wireless access point 110 and the second wireless access point 120 by at least one of VoIP protocols such as SIP, xGCP, or XMPP. As shown in FIG. 3, the first wireless access point 110 receives SIP messages from the base station 130 and transmits the received SIP messages to the second wireless access point 120. Next, the first wireless access point 110 receives the SIP messages responded from the second wireless access point 120 and transmits the received SIP messages back to the base station 130. In this manner, the first and the second communication are set up, and thus the voice conversation may be conducted. After the voice conversation is finished, the first and the second communication are disconnected. In this exemplary embodiment, as the signalling procedure is executed, converting the SIP messages to messages of another protocol is unnecessary for the first wireless access point 110. In this exemplary embodiment, the SIP messages includes messages SIP INVITE, SIP 180 Ringing, SIP 200 OK, SIP ACK, and SIP BYE that comply with SIP, which is not limited thereto. In this exemplary embodiment, the first wireless access point 110, for example, communicates with the single second wireless access point 120, which is not limited thereto. In another exemplary embodiment, the first wireless access point 110 may transmit the voice signals to multiple second wireless access points 120.

Figure 4:
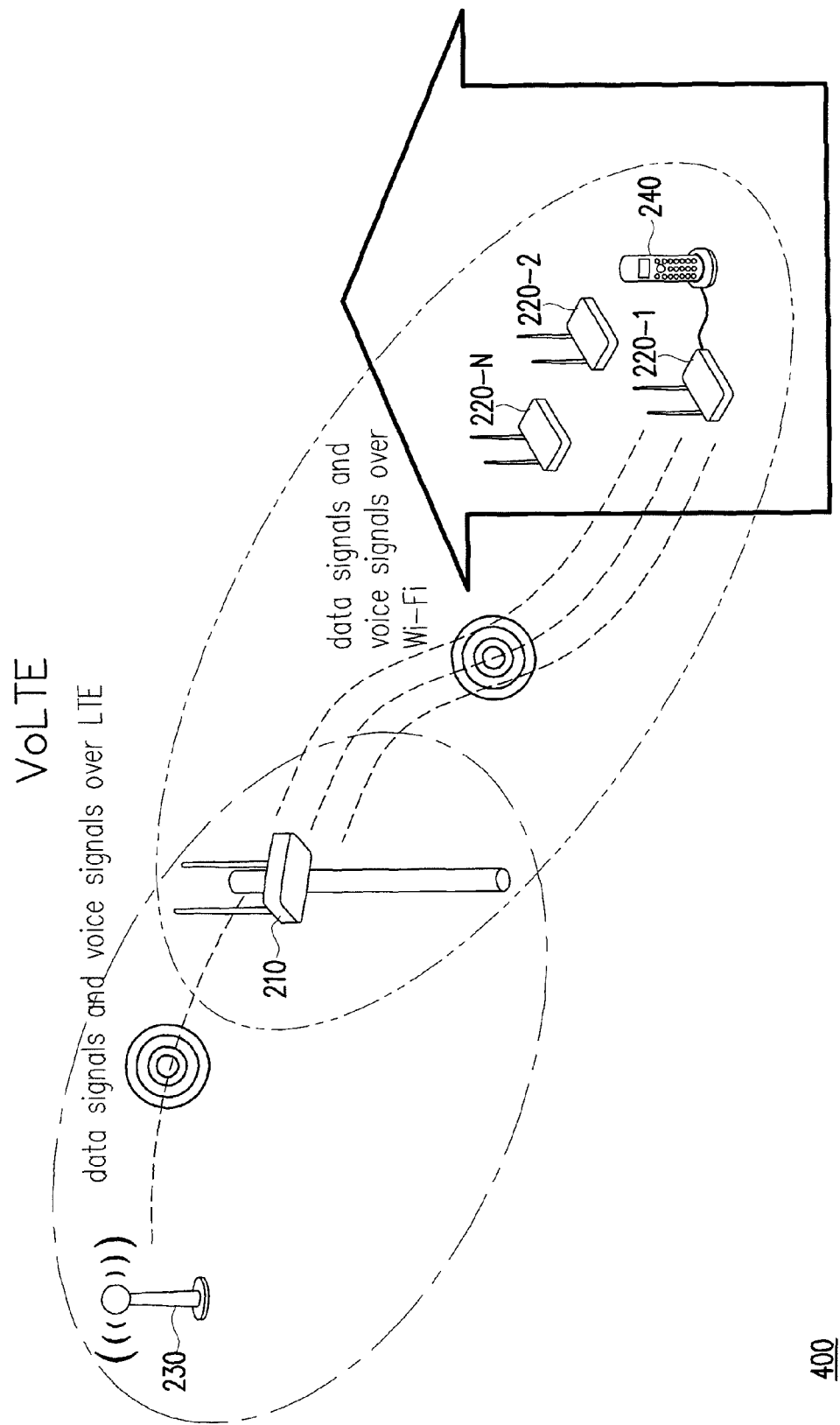
FIG. 4 illustrates a wireless network architecture according to another exemplary embodiment of the invention.
Figure 5:
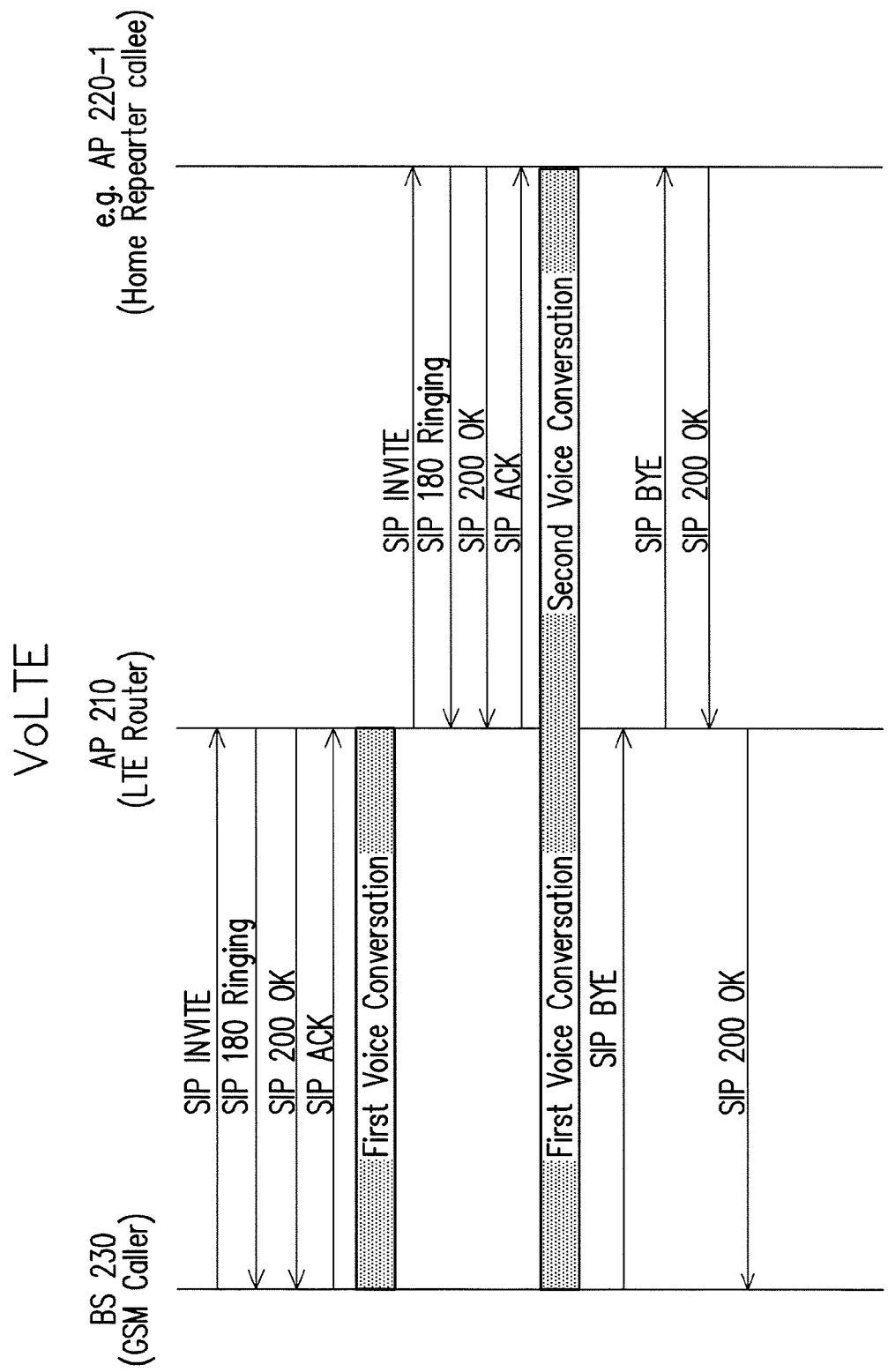
FIG. 5 is a time flowchart illustrating a voice conversation between the base station and the second wireless access point through the first wireless access point according to another exemplary embodiment of the invention.

FIG. 4 illustrates a wireless network architecture according to another exemplary embodiment. FIG. 5 is a time flowchart illustrating a voice conversation between the base station and the second wireless access point through the first wireless access point according to another exemplary embodiment. Referring to FIG. 4 to FIG. 5, the first wireless access point 210 receives voice signals from the base station 230 to set up the first voice conversation with the base station 230, and prompts the users in base station 230 side to dial an extension number. After receives the extension number, the first wireless access point 210 sends voice signals to at the least one of the multiple wireless access point 220-1 to 220-N and set up the second voice conversation. In the meantime, the first wireless access point 210 bridges the voice conversation between first voice conversation and second voice conversation. In this exemplary embodiment, the first wireless access point 210 receives SIP request messages from the base station 230 and transmits the SIP responding messages back to the base station 230, so as to set up the first voice conversation. In the first voice conversation, the first wireless access point 210 prompts the users in base station 230 side to dial an extension number. After recognize the extension number by dual-tone multi-frequency (DTMF) signalling, e.g. 220-1, the first wireless access points transmit voice signals to selected second wireless access points 220-1 to set up the second voice conversation. Finally, the first wireless access point 210 bridges the voice between the first voice conversation and the second voice conversation.

In this exemplary embodiment, the processor of the first wireless access point 210 respectively performs the signalling procedure with the base station 230 and the selected second wireless access point 220-1 by at least one of VoIP protocols, such as SIP, xGCP, or XMPP, via the WAN signal transceiver and the LAN signal transceiver of the first wireless access point 210 to set up the first communication between the first wireless access point 210 and the base station 230 and the second communication between the first wireless access point 210 and the second wireless access point 220-1.

The wireless network architecture and the communication method described in this exemplary embodiment are sufficiently taught, suggested, and embodied in the embodiments illustrated in FIG. 1 to FIG. 3, and therefore further description is omitted herein.

Figure 6:
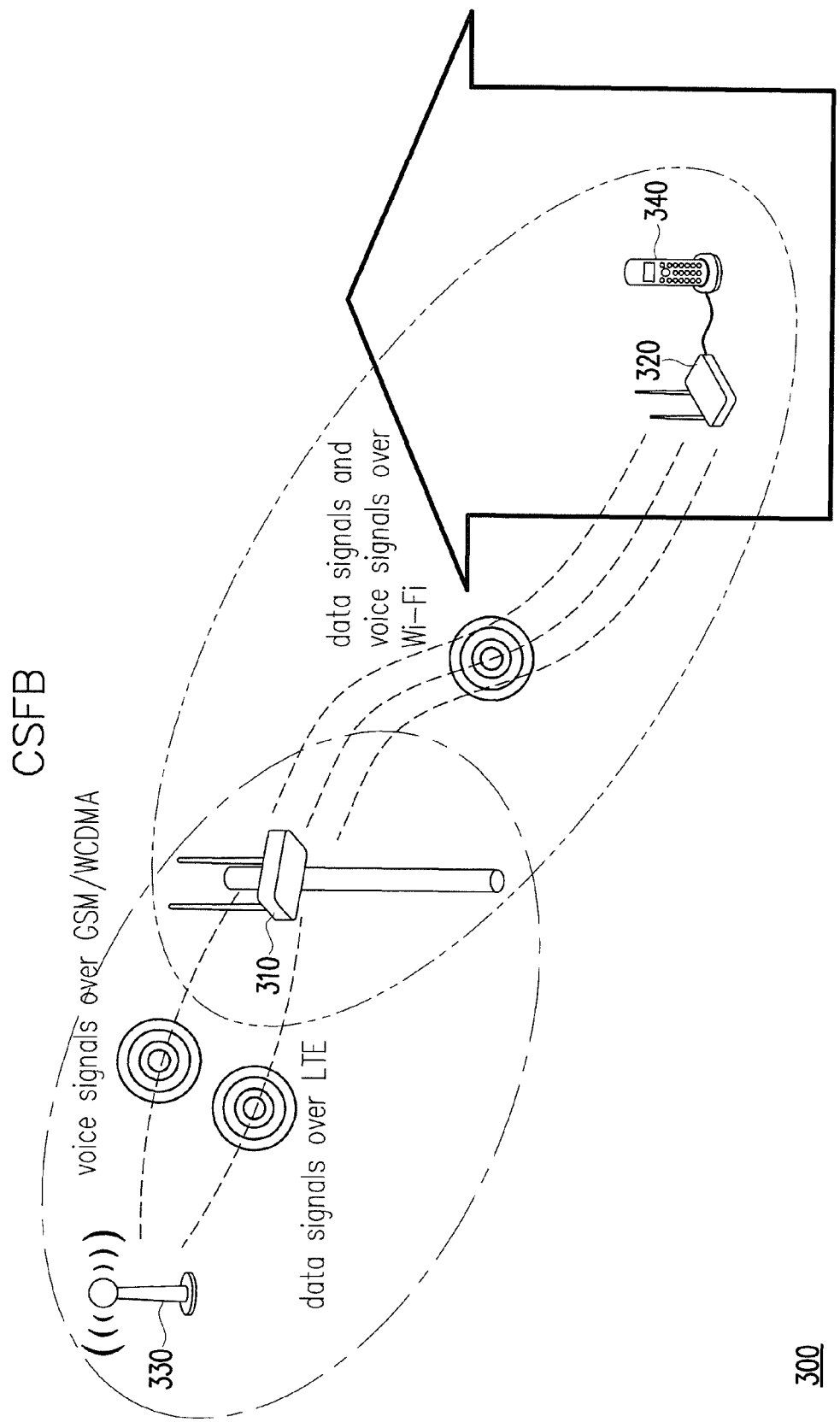
FIG. 6 illustrates a wireless network architecture according to another exemplary embodiment of the invention.
Figure 7:
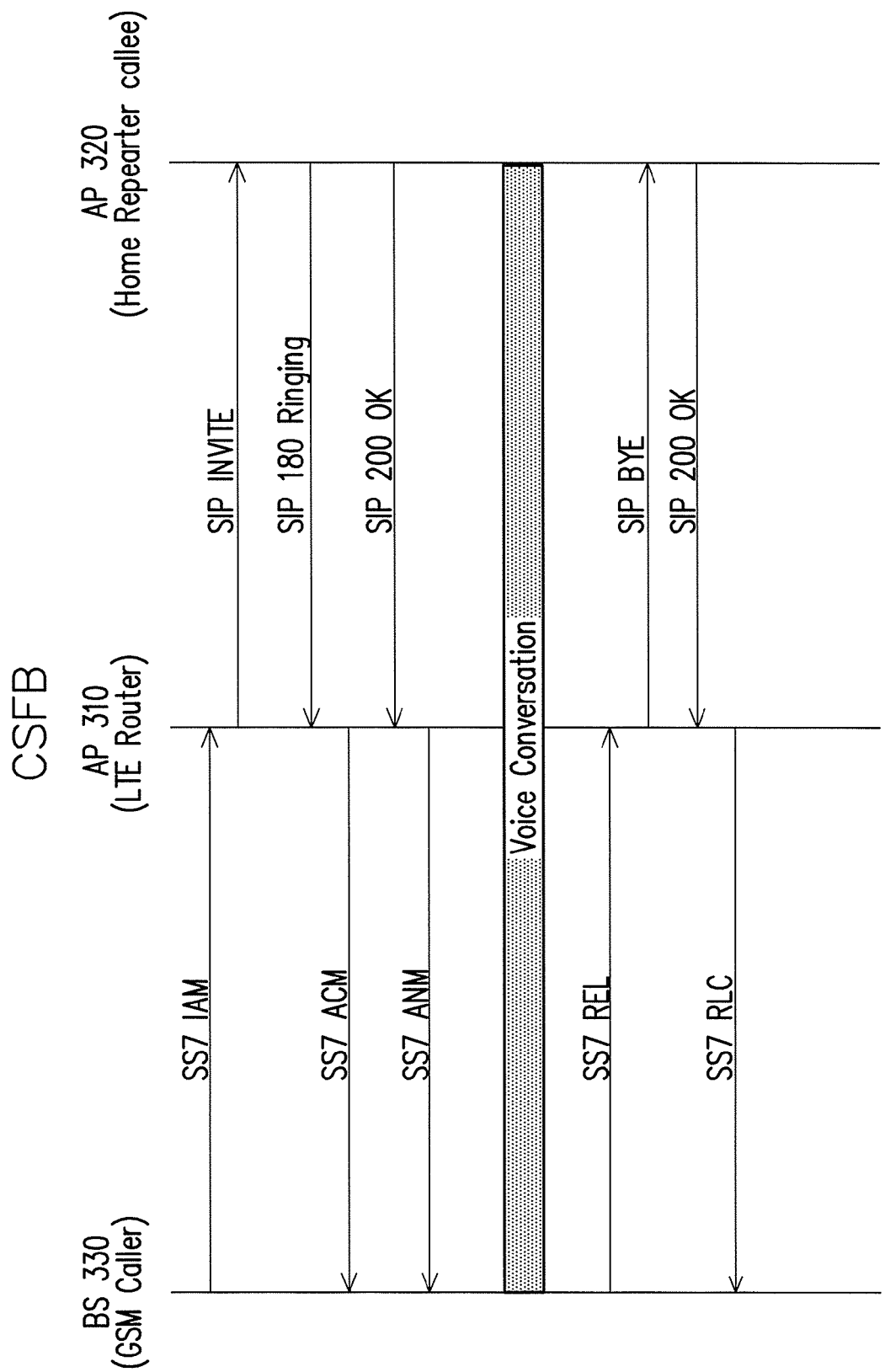
FIG. 7 is a time flowchart illustrating a voice conversation between the base station and the second wireless access point through the first wireless access point according to another exemplary embodiment of the invention.

FIG. 6 illustrates a wireless network architecture according to another exemplary embodiment. FIG. 7 is a time flowchart illustrating a voice conversation between the base station and the second wireless access point through the first wireless access point according to another exemplary embodiment. Referring to FIG. 6 to FIG. 7, in this exemplary embodiment via the local area network, the processor of the first wireless access point 310 controls the LAN signal transceiver thereof to transceive the voice signals and the data signals with the second wireless access point over a first communication standard, e.g. WiFi communication protocol. On the other hand, in this exemplary embodiment, via the telecommunication network, the processor of the first wireless access point 310 controls the WAN signal transceiver thereof to transceive the data signals with the base station 330 over a second communication standard, e.g. LTE communication protocol, and transceive the voice signals with the base station 330 over a third communication standard, e.g. the standard of global system for mobile communications (GSM) or the standard of wideband code division multiple access (WCDMA). That is to say, the first wireless access point 310 conducts a voice conversation between the second wireless access point 320 and the base station 330 by circuit switched fallback (CSFB) technology, for example.

In this exemplary embodiment, the processor of the first wireless access point 310 performs a signalling procedure with the base station 330 and the second wireless access point 320 before the voice conversation is conducted as shown in FIG. 7. In this exemplary embodiment, the processor of the first wireless access point 310 performs the signalling procedure via the WAN signal transceiver thereof to set up a first communication between the first wireless access point 310, i.e. the router, and the base station 330 by signalling system No. 7 (SS7). The processor of the first wireless access point 310 performs the signalling procedure via the LAN signal transceiver thereof to set up a second communication between the first wireless access point 310 and the second wireless access point 320 by at least one of VoIP protocols. Accordingly, the first and the second communication are set up based on different protocols in this exemplary embodiment. As shown in FIG. 7, the first wireless access point 310 receives SS7 messages from the base station 330 and converts the received SS7 messages to SIP messages. After conversion, the first wireless access point 310 transmits the SIP messages to the second wireless access point 320. Next, the first wireless access point 310 receives and converts the SIP messages responded from the second wireless access point 320, and then transmits the SS7 messages back to the base station 330. In this manner, the first and the second communication are set up, and thus the voice conversation may be conducted. After the voice conversation is finished, the first and the second communication connections are disconnected. In this exemplary embodiment, as the signalling procedure is executed, converting one of the SIP messages and the SS7 messages to another one of the SIP messages and the SS7 messages is necessary for the first wireless access point 310. In this exemplary embodiment, the SIP messages includes messages SIP INVITE, SIP 180 Ringing, SIP 200 OK, SIP ACK, and SIP BYE that comply with SIP, and the SS7 messages includes messages SS7 IAM, SS7 ACM, SS7 REL, and SS7 RLC that comply with SS7, which is not limited thereto.

In this exemplary embodiment, the first wireless access point 310, for example, communicates with the single second wireless access point 320, which is not limited thereto. In another exemplary embodiment, the first wireless access point 310 may transmit the voice signals to multiple second wireless access points 320.

Figure 8:
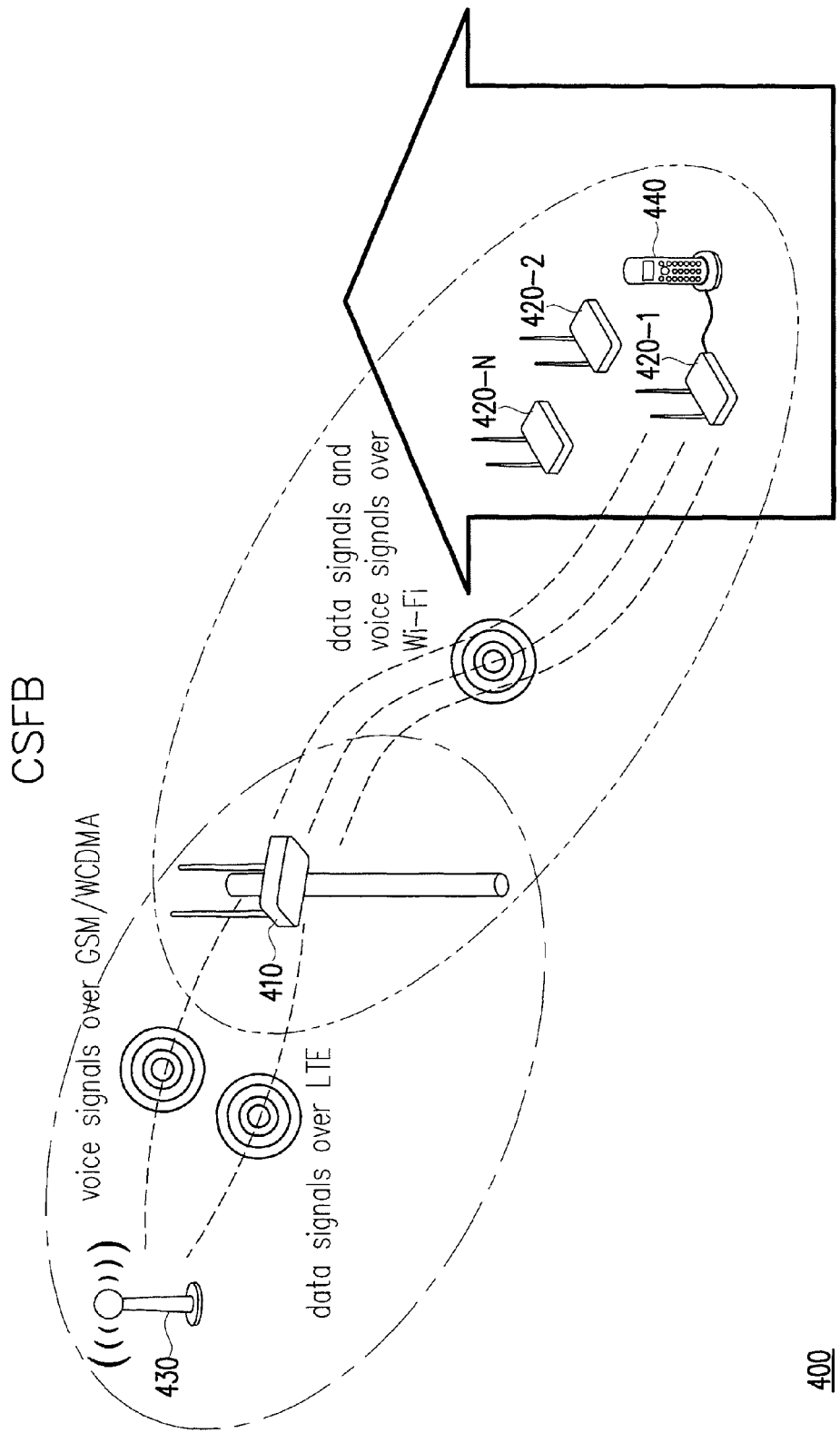
FIG. 8 illustrates a wireless network architecture according to another exemplary embodiment of the invention.
Figure 9:
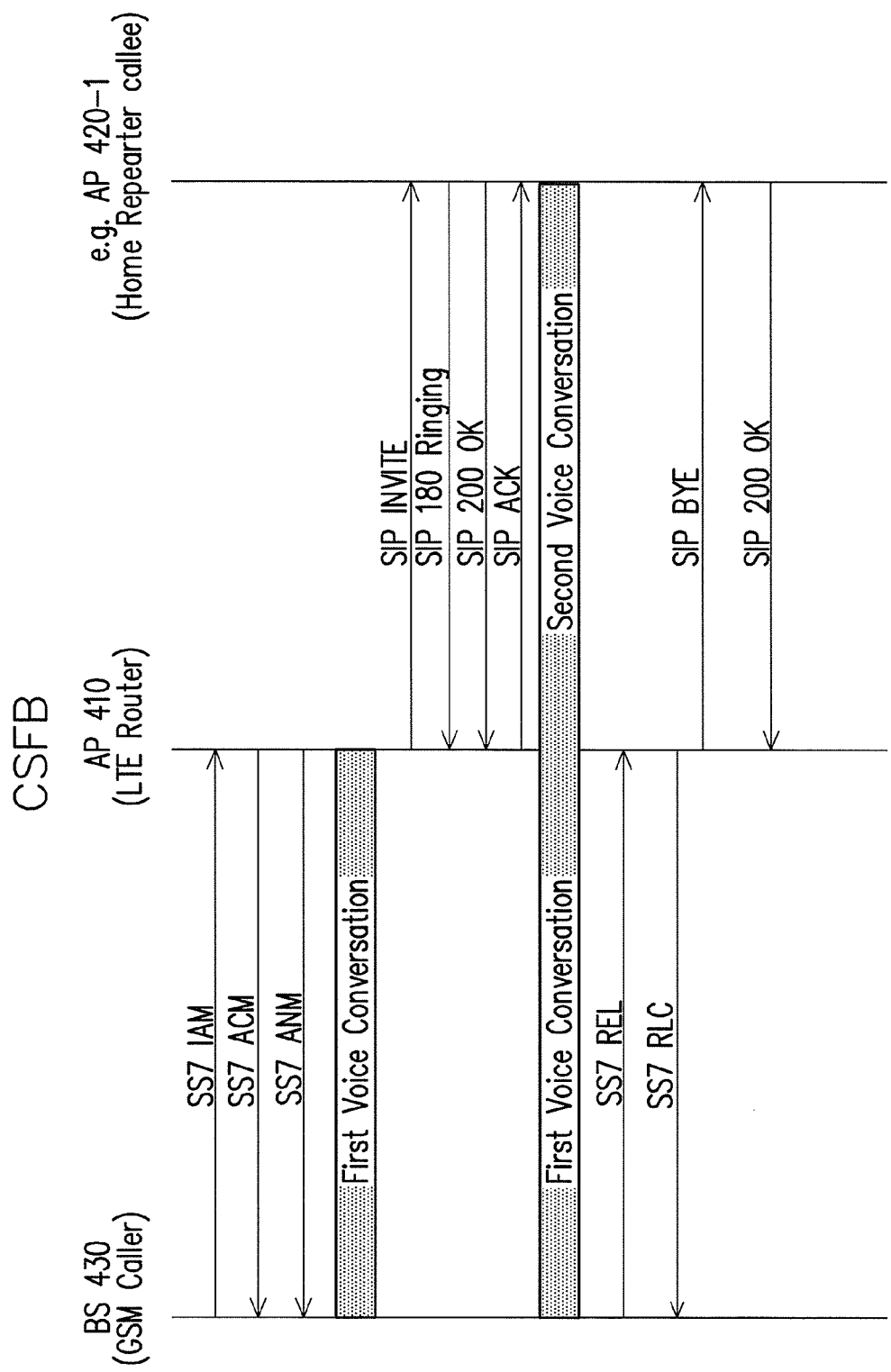
FIG. 9 is a time flowchart illustrating a voice conversation between the base station and the second wireless access point through the first wireless access point according to another exemplary embodiment of the invention.

FIG. 8 illustrates a wireless network architecture according to another exemplary embodiment. FIG. 9 is a time flowchart illustrating a voice conversation between the base station and the second wireless access point through the first wireless access point according to another exemplary embodiment. Referring to FIG. 8 to FIG. 9, the first wireless access point 410 receives voice signals from the base station 430 to set up the first voice conversation with base station 430, and prompts the users in base station 430 side to dial an extension number in the first voice conversation. After receives the extension number, the first wireless access point 410 sends voice signals to at the least one of the multiple wireless access point 420-1 to 420-N and set up the second voice conversation. In the meantime, the first wireless access point 410 bridges the voice conversation between first voice conversation and second voice conversation. In this exemplary embodiment, the first wireless access point 410 set up the first voice conversation with base station by receiving SS7 signals and prompts the users in base station 430 side to dial an extension number. After recognize the extension number by dual-tone multi-frequency (DTMF) signalling, e.g. 420-1, the first wireless access points transmit voice signals to the selected second wireless access points 420-1 to set up the second voice conversation. Finally, the first wireless access point 410 bridges the voice between the first voice conversation and the second voice conversation.

In this exemplary embodiment, the processor of the first wireless access point 410 performs the signalling procedure with the base station 430 by SS7 via the WAN signal transceiver thereof to set up the first communication between the first wireless access point 410 and the base station 430. By contrast, the processor of the first wireless access point 410 performs the signalling procedure with the second wireless access point 420-1 by SIP via the LAN signal transceiver thereof to set up the second communication between the first wireless access point 410 and the second wireless access point 420-1. Accordingly, the first and the second communication are set up based on distinct protocols in this exemplary embodiment.

Besides, the wireless network architecture and the communication method described in this exemplary embodiment are sufficiently taught, suggested, and embodied in the embodiments illustrated in FIG. 6 to FIG. 7, and further description is omitted herein.

In sum, the first wireless access point transceives voice signals and data signals with the base station via the telecommunication network. The first wireless access point transceives the voice signals and the data signals with the second wireless access point via the local area network. Accordingly, the voice conversation between the base station and the second wireless access point is conducted through the first wireless access point, and thus good signal quality is provided during the voice conversation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A router, comprising:
   a processor;
   a wide area network (WAN) signal transceiver controlled by the processor and configured to transceive voice signals and data signals with a base station via a telecommunication network and, after a voice conversation between the base station and the WAN signal transceiver is set up, to prompt the base station to signal an extension number via dual-tone multi-frequency (DTMF) through the voice conversation; and
   a local area network (LAN) signal transceiver controlled by the processor and configured to detect the extension number via DTMF signalling, to select a wireless access point from a plurality of candidate wireless access points according to the extension number, and to transceive the voice signals and the data signals with the wireless access point via a local area network.

2. The router according to claim 1, wherein via the local area network, the processor controls the LAN signal transceiver to transceive the voice signals and the data signals with the wireless access point over a first communication standard.

3. The router according to claim 2, wherein via the telecommunication network, the processor controls the WAN signal transceiver to transceive the data signals with the base station over a second communication standard and transceive the voice signals with the base station over a third communication standard.

4. The router according to claim 3, wherein the processor performs a signalling procedure with the base station by a first protocol via the WAN signal transceiver to set up a first communication between the router and the base station, and the processor performs the signalling procedure with the wireless access point by a second protocol via the LAN signal transceiver to set up a second communication between the router and the wireless access point.

5. The router according to claim 4, wherein when the first and the second communication set up, the processor conducts a first voice conversation between the base station and the router via the WAN signal transceiver.

6. The router according to claim 5, wherein when the first communication sets up, the processor conducts a second voice conversation between the router and the wireless access point via the WAN signal transceiver and the LAN signal transceiver.

7. The router according to claim 4, wherein the processor converts messages from a first format to a second format.

8. The router according to claim 2, wherein via the telecommunication network, the processor controls the WAN signal transceiver to transceive the voice signals and the data signals with the base station over a second communication standard.

9. The router according to claim 8, wherein the processor performs a signalling procedure with the base station and the wireless access point by at least one of VoIP protocols via the WAN signal transceiver and the LAN signal transceiver to set up a first communication between the router and the base station and a second communication between the router and the wireless access point.

10. The router according to claim 1, wherein the wireless access point is a repeater or an adapter.

* * * * *